United States Patent
Prasad et al.

(10) Patent No.: US 10,286,916 B2
(45) Date of Patent: May 14, 2019

(54) TRAILER ESTIMATION AND BLIND SPOT INFORMATION SYSTEM PERFORMANCE IMPROVEMENT

(71) Applicant: APTIV TECHNOLOGIES LIMITED, St. Michael (BB)

(72) Inventors: Premchand Krishna Prasad, Carmel, IN (US); Robert J. Cashler, Kokomo, IN (US)

(73) Assignee: APTIV TECHNOLOGIES LIMITED (BB)

( * ) Notice: Subject to any disclaimer, the term of this patent is extended or adjusted under 35 U.S.C. 154(b) by 194 days.

(21) Appl. No.: 15/186,601

(22) Filed: Jun. 20, 2016

(65) Prior Publication Data

US 2017/0363727 A1  Dec. 21, 2017

(51) Int. Cl.
| | |
|---|---|
| B60W 40/12 | (2012.01) |
| G01S 13/87 | (2006.01) |
| G01S 13/88 | (2006.01) |
| G08G 1/0962 | (2006.01) |
| B60W 50/14 | (2012.01) |
| G08G 1/16 | (2006.01) |
| G01S 7/41 | (2006.01) |
| G01S 13/93 | (2006.01) |
| G01S 13/86 | (2006.01) |
| G01S 13/00 | (2006.01) |

(52) U.S. Cl.
CPC ............ *B60W 40/12* (2013.01); *B60W 50/14* (2013.01); *G01S 7/411* (2013.01); *G01S 13/878* (2013.01); *G01S 13/88* (2013.01); *G08G 1/0962* (2013.01); *G08G 1/167* (2013.01); *B60W 2300/14* (2013.01); *G01S 13/865* (2013.01); *G01S 13/867* (2013.01); *G01S 13/931* (2013.01); *G01S 2013/9332* (2013.01); *G01S 2013/9353* (2013.01); *G01S 2013/9378* (2013.01); *G01S 2013/9385* (2013.01)

(58) Field of Classification Search
None
See application file for complete search history.

(56) References Cited

U.S. PATENT DOCUMENTS

| | | | | |
|---|---|---|---|---|
| 5,517,196 | A * | 5/1996 | Pakett | G01S 13/931 342/70 |
| 6,933,837 | B2 * | 8/2005 | Gunderson | B60R 21/013 180/167 |
| 7,904,222 | B2 * | 3/2011 | Lee | B60D 1/58 340/932.2 |
| 9,211,889 | B1 | 12/2015 | Hoetzer et al. | |
| 9,594,155 | B2 * | 3/2017 | Cashier | G01S 13/931 |

(Continued)

FOREIGN PATENT DOCUMENTS

| | | |
|---|---|---|
| DE | 10 2005 019550 A1 | 11/2006 |
| EP | 3 021 140 A1 | 5/2016 |

*Primary Examiner* — Bernarr E Gregory
(74) *Attorney, Agent, or Firm* — Joseph Victor Bonadies

(57) ABSTRACT

A blind-spot detection system includes an angle-detector, a radar-sensor, and a controller. The angle-sensor is used to determine a trailer-angle relative to a host-vehicle of a trailer being towed by the host-vehicle. The radar-sensor is used to detect an other-vehicle present in a blind-zone proximate to the host-vehicle. The controller is in communication with the angle-detector and the radar-sensor. The controller is configured to adjust a sensing-boundary that defines the blind-zone based on the trailer-angle.

10 Claims, 4 Drawing Sheets

(56) References Cited

U.S. PATENT DOCUMENTS

| | | | |
|---|---|---|---|
| 9,910,151 B2* | 3/2018 | Cashier | G01S 13/931 |
| 9,975,480 B2* | 5/2018 | Lai | G08G 1/167 |
| 2008/0169938 A1* | 7/2008 | Madau | B60R 1/08 |
| | | | 340/901 |
| 2008/0186204 A1 | 8/2008 | Buckley | |
| 2014/0222288 A1* | 8/2014 | Lavoie | G06F 17/00 |
| | | | 701/41 |
| 2014/0267688 A1* | 9/2014 | Aich | B60W 30/00 |
| | | | 348/113 |
| 2014/0267689 A1* | 9/2014 | Lavoie | B60W 30/00 |
| | | | 348/113 |
| 2016/0252610 A1* | 9/2016 | Smith | G01S 13/931 |
| | | | 342/27 |

* cited by examiner

TRAILER ESTIMATION AND BLIND SPOT INFORMATION SYSTEM PERFORMANCE IMPROVEMENT

TECHNICAL FIELD OF INVENTION

This disclosure generally relates to a vehicle radar-system, and more particularly relates to a system that determines if a detected target corresponds to a trailer towed by the vehicle, and defines a trailer zone that is occupied by the trailer and thereby excluded from a defined area where objects can be detected.

BACKGROUND OF INVENTION

It is known to equip a host-vehicle with a radar-system for detecting objects such as other-vehicles proximate to the host-vehicle. Such object detection is desirable for detecting, for example, other-vehicles in the so called blind-spot which is not readily observable by an operator of a host-vehicle using typical side-view and rear-view mirrors, and for detecting a trailer towed by the host-vehicle. Such object detection may also be useful to warn the operator of a rapidly approaching vehicle in an adjacent lane if the operator indicates that a lane-change is about to be executed by, for example, activating a turn-signal indicator, or for detecting objects behind the host-vehicle when backing-up. If the host-vehicle is towing a trailer, reflections of radar-signals by the trailer may interfere with the detection of a target that does not correspond to or is not associated with the trailer. In addition, when the host-vehicle is turning, the trailer may cause the warning-system to activate and give a false indication of another object or vehicle proximate to the host-vehicle, as the trailer detection zone only applies to the area directly behind the host-vehicle.

SUMMARY OF THE INVENTION

In accordance with one embodiment, a blind-spot detection system configured to detect objects proximate to a blind-spot of an operator of a vehicle is provided. The system includes an angle-detector, a radar-sensor, and a controller. The angle-sensor is used to determine a trailer-angle relative to a host-vehicle of a trailer being towed by the host-vehicle. The radar-sensor is used to detect an other-vehicle present in a blind-zone proximate to the host-vehicle. The controller is in communication with the angle-detector and the radar-sensor. The controller is configured to adjust a sensing-boundary that defines the blind-zone based on the trailer-angle.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Described herein is an improvement to vehicle radar-systems that are used to detect objects such as other-vehicles that are close to or approaching a host-vehicle on which the radar-system is installed. The improvement is related to detecting that the host-vehicle is towing a trailer while the host-vehicle is turning, and determining the size of the trailer so that the radar system can more readily discriminate detected targets that correspond to (i.e. are associated with) the trailer from detected targets that do not correspond to the trailer. This improvement is beneficial because the blind spot detection system (BLIS) will not alert the operator of the host-vehicle when the trailer towed by the host-vehicle is present in a blind-zone of the operator. The trailer size information may also be used to, for example, adjust expected vehicle dynamic characteristics, and thereby compensate for the extra load presented by the trailer. Other benefits include improvements to active safety features of a vehicle when towing the trailer, and to improve the controls of an autonomous vehicle that is towing the trailer.

Figure 1:
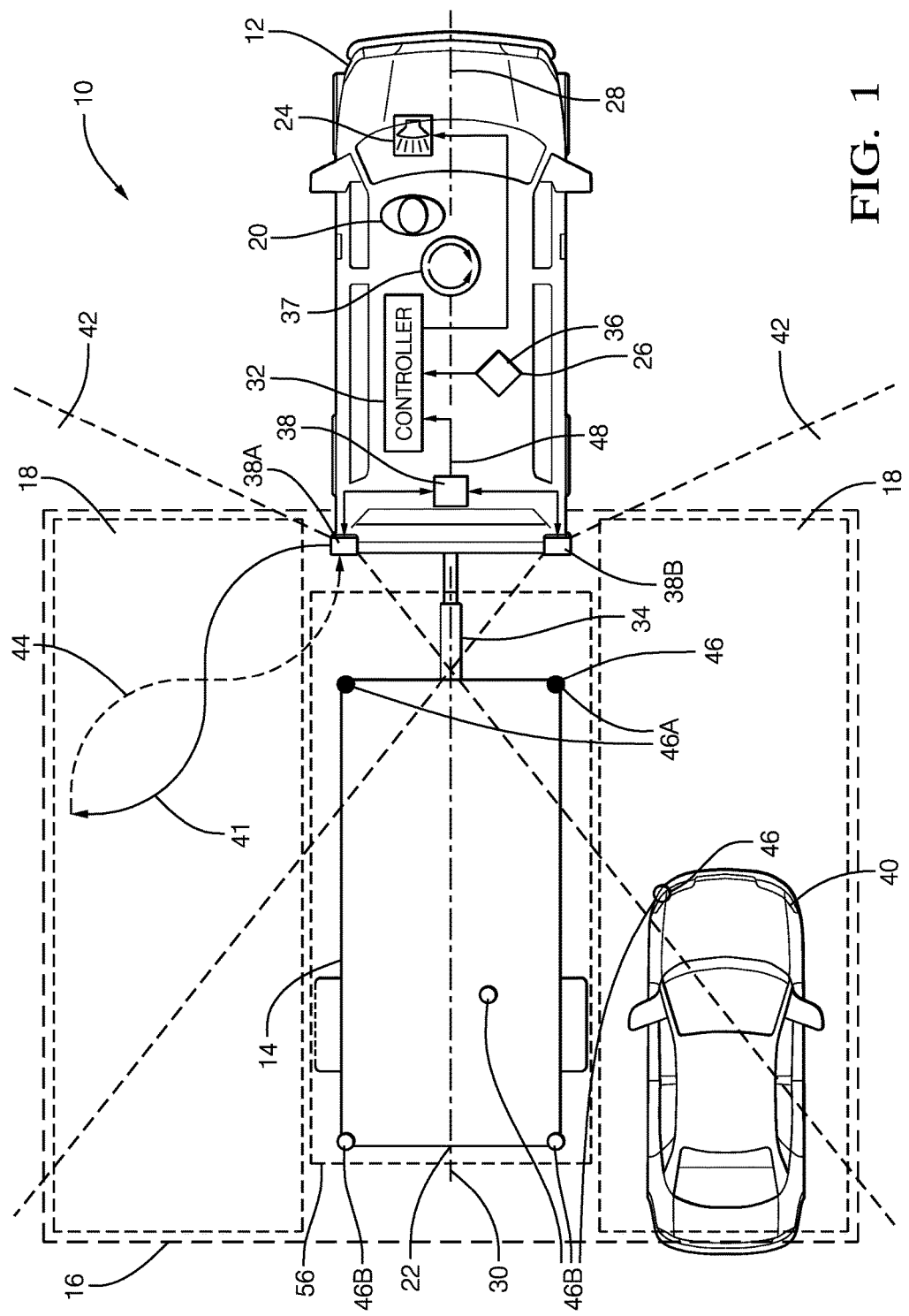
FIG. 1 is a top view of a host-vehicle equipped with a blind-spot detection system and towing a trailer in accordance with one embodiment.

FIG. 1 illustrates a non-limiting example of a blind-spot detection system 10, hereafter referred to as the system 10. The system 10 is generally configured to detect objects proximate to a host-vehicle 12 equipped with the system 10. As will be described in more detail below, the system 10 is an improvement over prior radar-systems because the system 10 is configured to determine the presence and size of a trailer 14 while the host-vehicle 12 is turning, and to adjust a sensing-boundary 16 that defines a blind-zone 18 of an operator 20 of the host-vehicle 12 based on a trailer-angle 22. This improvement enables the system 10 to continue to determine the presence and size of the trailer 14 when the trailer 14 is not directly behind the host-vehicle 12 and eliminate false warnings from an alert-device 24.

The system 10 includes an angle-detector 26 used to determine the trailer-angle 22 relative to the host-vehicle 12 of the trailer 14 being towed by the host-vehicle 12. The trailer-angle 22 is defined as the angle between a host-vehicle-longitudinal-axis 28 and a trailer-longitudinal-axis 30, and is shown to be zero degrees (0°) in FIG. 1 (i.e. the trailer 14 is directly behind the host-vehicle 12). The angle-detector 26 is in electrical communication with a controller 32, and may be a device (not shown) mounted on a trailer-hitch 34 of the host-vehicle 12 or on the trailer 14, that is configured to provide a measure of the angle that exists between the host-vehicle-longitudinal-axis 28 and the trailer-longitudinal-axis 30. The angle-detector 26 may be a rear-facing camera (not shown), Lidar-sensor (not shown), or any other suitable method to detect the trailer-angle 22. Preferably, the function of the angle-detector 26 may be provided by a yaw-sensor 36 that may already exist on most vehicles, such as the 6DF-1N6-C2-HWL from Honeywell Sensing and Control, Golden Valley, Minn., USA, and is used to determine a yaw-rate 37 of the host-vehicle 12, from which the trailer-angle 22 may be determined by the controller 32. It is advantageous to use the yaw-sensor 36 of the host-vehicle 12, in conjunction with a radar-sensor 38, to determine the trailer-angle 22 to eliminate a separate component of the system 10, reducing cost and complexity.

The system 10 also includes the radar-sensor 38 used to detect an other-vehicle 40 present in the blind-zone 18 proximate to the host-vehicle 12. The radar-sensor 38 is configured to emit a radar-signal 41 toward a defined-area 42 proximate to the host-vehicle 12, and detect a reflected-signal 44 arising from the radar-signal 41 being reflected by detected-targets 46. When the trailer 14 is being towed, there will generally be some consistent reflected signals created from strong-targets 46A such as the front of the trailer 14 or other highly reflective objects such as wheel wells or fenders of the trailer 14; and some intermittent reflected signals from weak-targets 46B such as the back bumper of the trailer 14 or smaller examples of the other-vehicle 40 such as a motorcycle for example. Reflected-signals 44 from the weak-targets 46B may be, for example, a multi-path reflection from under the trailer 14 as the signal bounces between the trailer 14 and ground, or by multi-path reflections traveling through a grated open-trailer or cross-frame members of the frame of the trailer 14.

In the non-limiting example illustrated in FIG. 1, the radar-sensor 38 includes a left-sensor 38A and a right-sensor 38B. A radar sensor-system with a similarly configured radar-sensor 38 is available from Delphi Inc. of Troy, Mich., USA and marketed as an Electronically Scanning Radar (ESR) or a Rear-Side-Detection-System (RSDS). It is contemplated that the teachings presented herein are applicable to radar-systems with one or more sensor devices.

The radar-sensor 38 is generally configured to output a reflection-signal 48 that may include data indicative of a detected-target 46 present in the defined-area 42. Data that corresponds to the strong-targets 46A will generally be from consistent, non-intermittent signals. However, data that corresponds to the weak-targets 46B may be intermittent or have some substantial variability due to a low signal-to-noise ratio.

By way of example and not limitation, the radar-sensor 38 may be configured to output a continuous or periodic data stream that includes a variety of signal characteristics associated with each target detected. The signal characteristics may include, but are not limited to a range 50 (FIG. 2) to the detected-target 46 from the host-vehicle 12, a target-angle 52 to the detected-target 46 relative to the host-vehicle-longitudinal-axis 28, an amplitude (not shown) of the reflected-signal 44, and a relative-velocity 54 of closure relative to the detected-target 46. A target is generally detected because the reflected-signal 44 from the detected-target 46 has sufficient signal strength to meet some predetermined threshold. That is, there may be targets that reflect the radar-signal 41, but the strength of the reflected-signal 44 is insufficient to be characterized as one of the detected-targets 46.

The system 10 may include the controller 32 configured to receive the reflection-signal 48 from the radar-sensor 38 and receive the trailer-angle 22 from the angle-detector 26. The controller 32 may include a processor (not shown) such as a microprocessor or other control circuitry such as analog and/or digital control circuitry including an application specific integrated circuit (ASIC) for processing data as should be evident to those in the art. The controller 32 may include memory, including non-volatile memory, such as electrically erasable programmable read-only memory (EEPROM) for storing one or more routines, thresholds and captured data. The one or more routines may be executed by the processor to perform steps for determining if signals received by the controller 32 indicate the presence of objects as described herein. The controller 32 may also be configured to receive vehicle related data such as yaw-rate 37, vehicle speed (not shown), and transmission gear (not shown).

The controller 32 is generally configured to determine if the reflection-signal 48 arising from the detected-target 46 corresponds to (i.e. is associated with) the trailer 14 being towed by the host-vehicle 12. That is, the controller 32 determines if the trailer 14 is present, so is actually being towed by the host-vehicle 12. The controller 32 is also generally configured to define a trailer-boundary 56 characterized as occupied by the trailer 14 and thereby excluded from the defined-area 42 where objects can be detected in the blind-zone 18. By defining the portion of the defined-area 42 that is the trailer-boundary 56, the controller 32 can more readily determine if what seems to be a new target indicated by the reflected-signal 44 is likely from the trailer 14, or is likely from something other than the trailer 14, such as the other-vehicle 40. The controller 32 may also be configured to activate the alert-device 24 if the other-vehicle 40 is detected in the blind-zone 18. The blind-zone 18 preferably extends for a distance of four meters (4-meters) beyond the rear of the trailer 14 and may be calibrated to any distance desired. The blind-zone 18 preferably extends for a distance of 4-meters perpendicular to the left-side and right side of the host-vehicle 12 to sense objects in an adjoining roadway lane and may be calibrated to any distance desired. The boundaries of the defined-area 42 extend to the limits of the radar-signal 41 and are considered to be infinite for the purposes of this example. As used herein, the trailer-boundary 56 and the blind-zone 18 are both subsets of the sensing-boundary 16.

The reflection-signal 48 may be analyzed to categorize the data from each detected-target 46 with respect to a list of previously detected-targets 46 having established tracks. As used herein, a track refers to one or more data sets that have been associated with a particular one of the detected-targets 46. By way of example and not limitation, if the amplitude of the reflected-signal 44 indicated in the reflection-signal 48 is above a predetermined amplitude threshold, then the controller 32 determines if the data corresponds to a previously detected-target 46 or if a new-target has been detected. If the data corresponds to a previously detected-target 46, the data is added to or combined with prior data to update the track of the previously detected-target 46. If the data does not correspond to any previously detected-target 46 because, for example, it is located too far away from any previously detected-target 46, then it may be characterized as a new-target and assigned a unique track identification number. The identification number may be assigned according to the order that data for a new detected-target 46 is received, or may be assigned an identification number according to a grid location in the defined-area 42.

The expectation is that a detected-target 46 or a track that corresponds to (i.e. is associated with) the trailer 14 would have a relative-velocity 54 near zero, and that this condition would persist for an extended period of time. That is, the detected-target 46 corresponds to the trailer 14 if a range 50 to the detected-target 46 varies less than a variation threshold (e.g. less than 0.25 meters) for greater than a time threshold (e.g. greater than 5 seconds). It is noted that characterizing a target as having a relative-velocity 54 near zero and having a variation in range 50 less than a variation threshold are effectively the same characterization. As such, references to the term 'range-rate' in the discussion that follows are directly comparable to the terms 'relative-velocity', 'relative-rate' and 'variation-in-range'.

Figure 2:
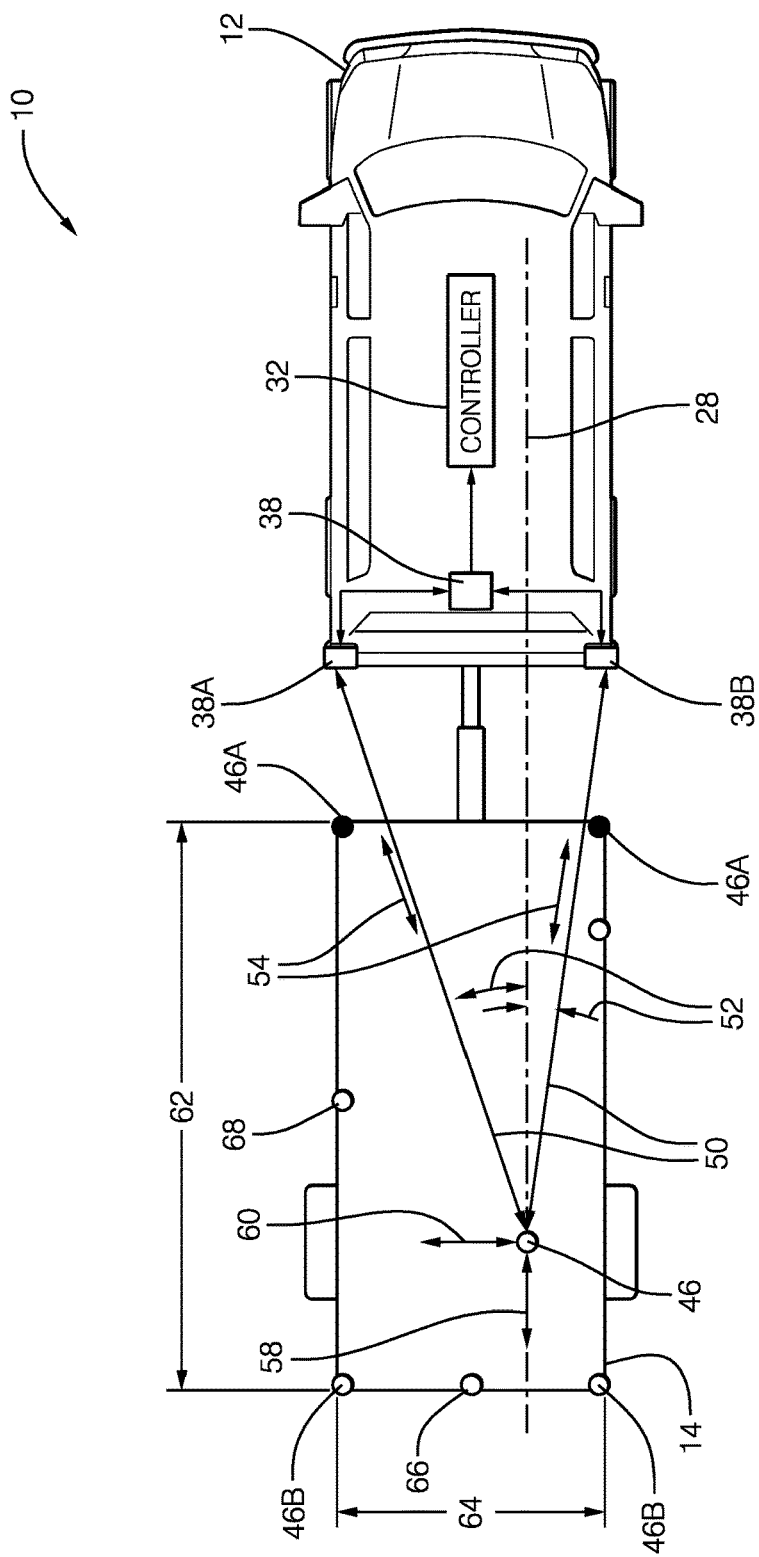
FIG. 2 is a close-up of FIG. 1 in accordance with one embodiment.
Figure 3:
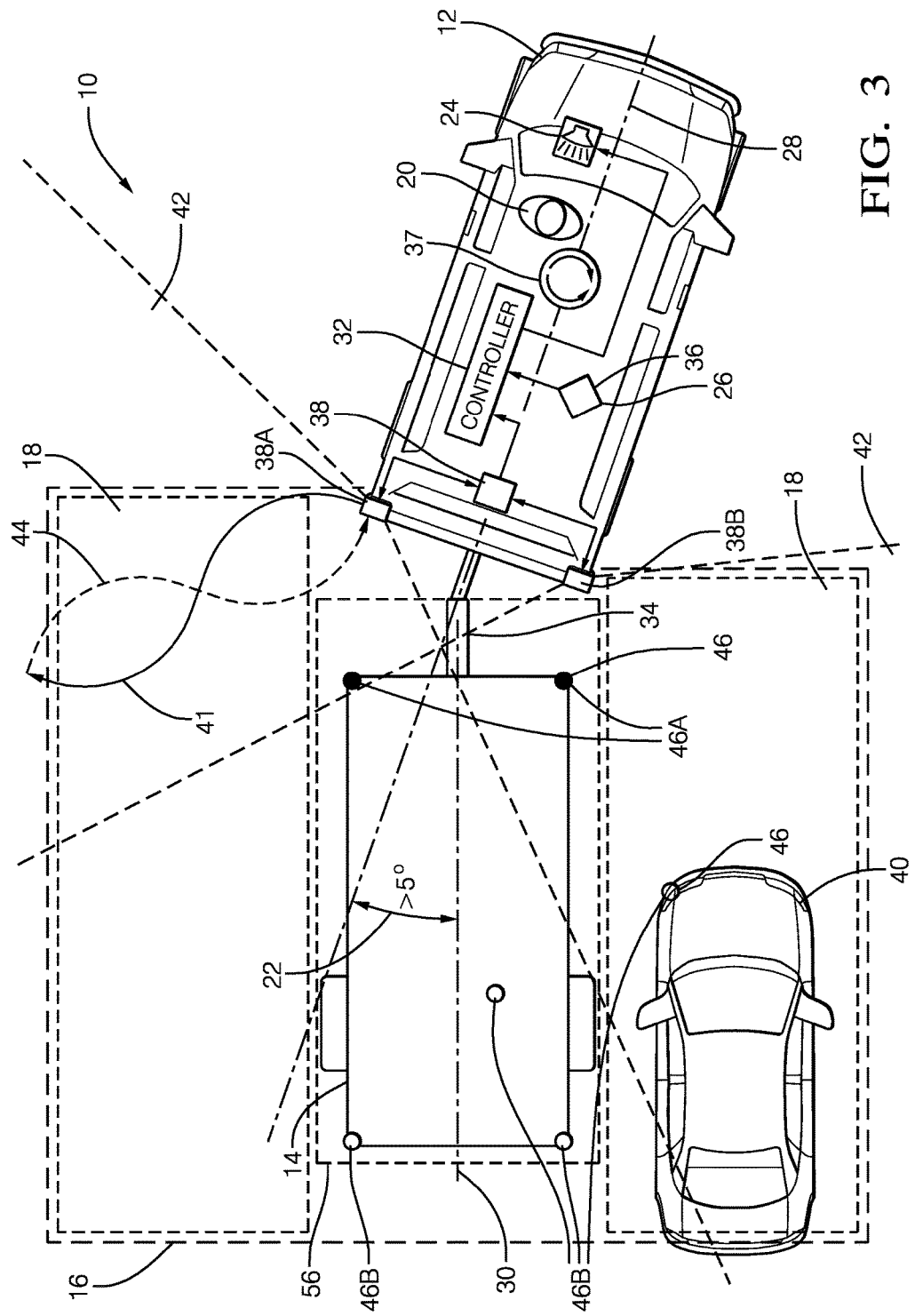
FIG. 3 is a top view of a host-vehicle equipped with a blind-spot detection system and towing a trailer in accordance with one embodiment.

FIG. 3 illustrates the same system 10 from FIG. 1 when the host-vehicle 12 is turning while towing the trailer 14. In this non-limiting example the controller 32 is further configured to adjust the sensing-boundary 16 based on the trailer-angle 22. The controller 32 is further configured to adjust the trailer-boundary 56 based on the adjusted sensing-boundary 16 such that the detected-target 46, or a track that corresponds to the trailer 14, may continue to be tracked by the system 10 as described previously. The controller 32 is further configured to adjust the blind-zone 18 based on the adjusted trailer-boundary 56 to maintain the blind-zone 18 proximate to the trailer-boundary 56. If these adjustments are not made, the previously detected-targets 46 in the trailer-boundary 56 would be considered by the system 10 as being in the blind-zone 18 (due to the yaw of the host-vehicle 12), likely resulting in a false detection of new-targets and cause the alert-device 24 to be activated. The controller 32 is further configured to use the radar-sensor 38 to determine the relative-velocity 54 of the tracked-target associated with the trailer 14, and determine a trailer-angle 22 based on a longitudinal-velocity 58 and a lateral-velocity 60 (FIG. 2) of the detected-target 46.

An additional benefit to adjusting the trailer-boundary 56 based on the trailer-angle 22 may be realized in other autonomous-vehicle or semi-autonomous-vehicle applications where the controller 32 may be configured to determine whether a current path of the host-vehicle 12 and trailer 14 may collide with an object or other-vehicle 40, based on the turning path of the combination of the host-vehicle 12 and the trailer 14. In such a situation, the controller 32 may also be configured to activate the alert-device 24 to warn the operator 20 of the impending collision.

Figure 4:
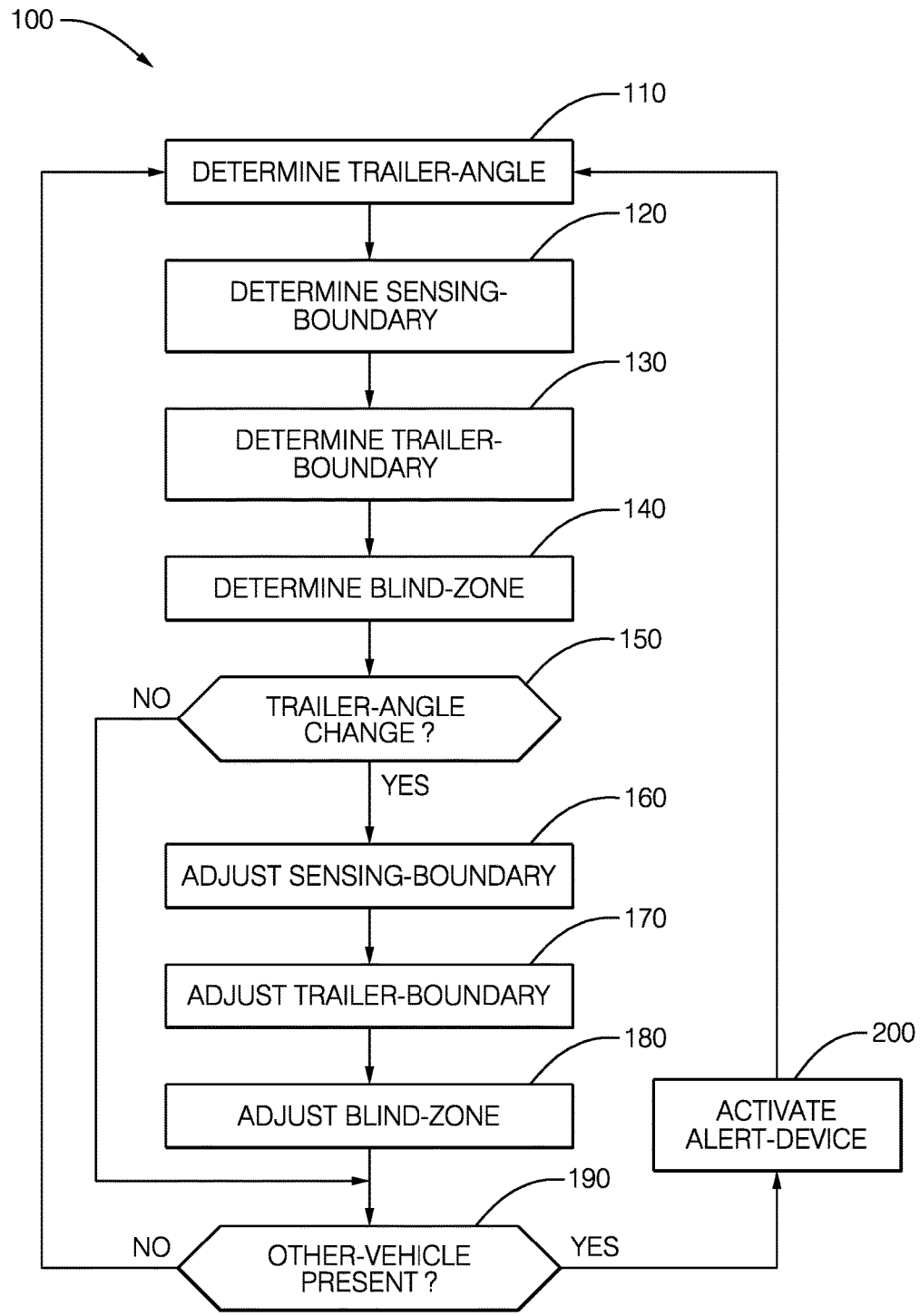
FIG. 4 is a flowchart of a method executed by the system of FIG. 3 in accordance with one embodiment.

FIG. 4 illustrates a non-limiting method 100 that is an overview of a process carried out by the controller 32 to determine the trailer-angle 22 and adjust the sensing-boundary 16 based on the trailer-angle 22.

Step 110, DETERMINE TRAILER-ANGLE, may include the controller 32 receiving an indication of the trailer-angle 22 from an angle-detector 26 used to determine the trailer-angle 22 relative to the host-vehicle 12 of the trailer 14 being towed by the host-vehicle 12. The trailer-angle 22 is defined as the angle between a host-vehicle-longitudinal-axis 28 and a trailer-longitudinal-axis 30, and is shown to be zero degrees (0°) in FIG. 1 (i.e. the trailer 14 is directly behind the host-vehicle 12). The angle-detector 26 is in electrical communication with a controller 32, and may be a device (not shown) mounted on the trailer-hitch 34 of the host-vehicle 12 or on the trailer 14, that is configured to provide a measure of the angle that exists between the host-vehicle-longitudinal-axis 28 and the trailer-longitudinal-axis 30. Preferably the angle-detector 26 is a yaw-sensor 36 that may exist on most vehicles, such as the 6DF-1N6-C2-HWL from Honeywell Sensing and Control, Golden Valley, Minn., USA, and is used to determine the yaw-rate 37 of the host-vehicle 12, from which the trailer-angle 22 may be determined by the controller 32. It is advantageous to use the yaw-sensor 36 of the host-vehicle 12, in conjunction with a radar-sensor 38, to determine the trailer-angle 22 to eliminate a separate component of the system 10, reducing cost and complexity. Preferably the controller 32 may determine the trailer-angle 22 by using the radar-sensor 38 to determine the relative-velocity 54 of the tracked-target associated with the trailer 14, and determine the trailer-angle 22 based on a longitudinal-velocity 58 and a lateral-velocity 60 (FIG. 2) of the detected-target 46.

Step 120, DETERMINE SENSING-BOUNDARY, may include the controller 32 receiving a signal from the radar-sensor 38 configured to emit a radar-signal 41 toward a defined-area 42 proximate to the host-vehicle 12, and detect a reflected-signal 44 arising from the radar-signal 41 being reflected by detected-targets 46. When the trailer 14 is being towed, there will generally be some consistent reflected signals created from strong-targets 46A such as the front of the trailer 14 or other highly reflective objects such as wheel wells or fenders of the trailer 14; and some intermittent reflected signals from weak-targets 46B such as the back bumper of the trailer 14 or smaller examples of the other-vehicle 40 such as a motorcycle for example. Reflected signals from the weak-targets 46B may be, for example, a multi-path reflection from under the trailer 14 as the signal bounces between the trailer 14 and ground, or by multi-path reflections traveling through a grated open-trailer or cross-frame members of the frame of the trailer 14. Preferably, the sensing-boundary 16 extends for a distance of 4-meters beyond the rear of the trailer 14, and extends for a distance of 4-meters perpendicular to the left-side and right side of the host-vehicle 12.

Step 130, DETERMINE TRAILER-BOUNDARY, may include using the zero range-rate (ZRR) tracks to determine a length 62 of the trailer 14 and a width 64 of the trailer 14 (FIG. 2). Given the track data, each track is compared to a defined bounded area behind the host-vehicle 12 and only tracks that are within those bounds are used. The boundary is set by calibrations and the current boundary is 2.4 meters wide and 16.2 meters long. Additional constraints such as minimum amplitudes or detections sources may be applied to qualify a track prior to using it to determine the length 62 and width 64. After the final track set is determined, the length 62 and width 64 is determined in two steps: Determine the unfiltered (raw) value, and Filter the raw value to the final value. The unfiltered length 62 is determined by taking the maximum longitudinal-distance back from the host-vehicle's 12 rear bumper and the raw width 64 is determined by taking the maximum lateral-distance between any two points within the bounded area. The unfiltered measures are then filtered. One way of filtering is to use a low pass filter with a long time constant such as five seconds. The second way of filtering is to create a histogram of the unfiltered measures where one count is added to the bin that corresponds to the current unfiltered measure and then the bin with the highest counts is selected as the filtered measure. The histogram filter approach appears to create a more stable estimation than the low pass filtered measure. By executing the processes described above, the length 62 of the trailer-boundary 56 can be determined based on a longitudinal distance to a most-distant-target 66 that corresponds to the trailer 14 and is closer to the host-vehicle 12 than a maximum trailer-length (16.2 meters). Similarly, the width 64 of the trailer-boundary 56 can be determined based on a lateral distance between a left-most-target 68 that corresponds to the trailer 14, and a right-most-target 70 that corresponds to the trailer 14.

Step 140, DETERMINE BLIND-ZONE, may include determining a blind-zone 18 proximate to the host-vehicle 12 that may extend a distance of 4-meters beyond the rear of the trailer 14 towed by the host-vehicle 12 and may extend a distance of 4-meters perpendicular to the left-side and right-side of the host-vehicle 12.

Step 150, TRAILER ANGLE CHANGE?, directs a logic path of the method 100 based on the outcome of the determination of whether or not the trailer-angle 22 has changed more than a predetermined threshold. The threshold may be set to 5° for normal driving conditions, above which the trailer-angle 22 is considered by the controller 32 to have changed. The threshold may be varied based on the speed and direction of the host-vehicle 12. For example, the threshold may be increased at higher speeds to accommodate for trailer-sway, or decreased at lower speeds to improve the sensitivity of the system 10 when performing a backing maneuver of the trailer 14.

Step 160, ADJUST SENSING-BOUNDARY, may include the step of adjusting the sensing-boundary 16 such that it remains generally centered along the trailer-longitudinal-axis 30. This adjustment generally matches the change in the trailer-angle 22 as determined by the angle-detector 26.

Step 170, ADJUST TRAILER-BOUNDARY, may include the step of adjusting the trailer-boundary 56 and may include using the zero range-rate (ZRR) tracks to determine a length 62 of the trailer 14 and a width 64 of the trailer 14 as described previously.

Step 180, ADJUST BLIND-ZONE, may include adjusting the blind-zone 18 to remain proximate to the sides of the trailer 14. This adjustment generally matches the change in the trailer-angle 22 as determined by the angle-detector 26.

Step 190, OTHER-VEHICLE PRESENT?, directs a logic path of the method 100 based on the outcome of the determination of whether or not the other-vehicle 40 is present in the blind-zone 18. The controller 32 is generally configured to determine if the reflection-signal 48 arising from the detected-target 46 corresponds to (i.e. is associated with) the trailer 14 being towed by the host-vehicle 12. The controller 32 is also generally configured to define the trailer-boundary 56 characterized as occupied by the trailer 14 and thereby excluded from the defined-area 42 where objects can be detected in the blind-zone 18. By defining the portion of the defined-area 42 that is the trailer-boundary 56, the controller 32 can more readily determine if what seems to be a new target indicated by the reflected-signal 44 is likely from the trailer 14, or is likely from something other than the trailer 14, such as the other-vehicle 40.

Step 200, ACTIVATE ALERT-DEVICE, may include activating the alert-device 24 to warn the operator 20 that the other-vehicle 40 has entered the blind-zone 18. The alert device may be an audible warning, a visual warning, and a vibrational warning.

Accordingly, a blind-spot detection system (the system 10), a controller 32 for the system 10 and a method 100 of operating the system 10 is provided. The teachings presented herein advantageously improve the performance of the system 10 by adjusting the sensing-boundary 16 that defines the blind-zone 18 based on the trailer-angle 22 to reduce the instances of false-positive detections of objects within an area occupied by the trailer 14 being towed by the host-vehicle 12 when the host-vehicle 12 is turning.

While this invention has been described in terms of the preferred embodiments thereof, it is not intended to be so limited, but rather only to the extent set forth in the claims that follow.

We claim:

1. A blind-spot detection system configured to detect objects proximate to a blind-spot of an operator of a vehicle, said system comprising:
    an angle-detector used to determine a trailer-angle relative to a host-vehicle of a trailer being towed by the host-vehicle;
    a radar-sensor used to detect an other-vehicle present in a blind-zone proximate to the host-vehicle;
    a controller in communication with the angle-detector and the radar-sensor, said controller configured to adjust a sensing-boundary that defines the blind-zone based on the trailer-angle.

2. The system in accordance with claim 1, wherein the system includes an alert-device detectable by the operator of the vehicle, and the controller is further configured to activate the alert-device when the other-vehicle is detected within the sensing-boundary.

3. The system in accordance with claim 1, wherein the angle-detector includes a yaw-sensor used to determine a yaw-rate of the host-vehicle, and the trailer-angle is determined based on the yaw-rate.

4. The system in accordance with claim 1, wherein the controller is further configured to use the radar-sensor to determine a relative-velocity of a tracked-target associated with the trailer, and determine the trailer-angle based on a longitudinal-velocity and a lateral-velocity.

5. The system in accordance with claim 1, wherein the controller is further configured to determine a trailer-boundary based on the trailer-angle, said trailer-boundary used to adjust the blind-zone.

6. A method to detect an other-vehicle proximate to a blind-spot of an operator of a host-vehicle, said method comprising:
    receiving an indication of a trailer-angle of a trailer towed by the host-vehicle from an angle-detector;
    receiving an indication of an other-vehicle present in a blind-zone proximate to the host-vehicle from a radar sensor; and
    adjusting a sensing-boundary that defines the blind-zone based on the trailer-angle.

7. The method in accordance with claim 6, wherein the method includes activating an alert-device detectable by the operator when the other-vehicle is detected within the sensing-boundary.

8. The method in accordance with claim 6, wherein the method includes determining a yaw-rate of the host-vehicle, and determining the trailer-angle based on the yaw-rate.

9. The method in accordance with claim 6, wherein the method includes determining a relative-velocity of a tracked-target associated with the trailer, and determining the trailer-angle based on the relative-velocity.

10. The method in accordance with claim 6, wherein the method includes determining a trailer-boundary based on the trailer-angle, and further adjusting the blind-zone based on the trailer-boundary.

* * * * *